United States Patent

Callan

[15] 3,674,735

[45] July 4, 1972

[54] SEMI-VULCANIZED BUTYL RUBBER FOR SEALANT APPLICATIONS

[72] Inventor: John E. Callan, Trenton, N.J.

[73] Assignee: Cities Service Company, New York, N.Y.

[22] Filed: Dec. 22, 1969

[21] Appl. No.: 887,401

[52] U.S. Cl....................260/33.6, 260/33.6 A, 260/41.5 R, 260/41.5 A
[51] Int. Cl..............................................C08c 9/00
[58] Field of Search..........................260/33.6 AQ

[56] References Cited

OTHER PUBLICATIONS

Damusis– Sealants (Reinhold) (N.Y.) (1967), pages 290 and 298.
Rubber World– Materials and Compounding Ingredients for Rubber and Plastics (Rubber World) (1965), page 141.
Higgins– Enjay Butyl Based Mastics Containing a Permanent Plasticizer (Enjay Chem. Co. Technical Bulletin B–94 (1966)
Morton– Introduction to Rubber Technology (Reinhold) (N.Y.) (1959), pages 164– 171.

*Primary Examiner*—Morris Liebman
*Assistant Examiner*—H. H. Fletcher
*Attorney*—J. Richard Geaman

[57] ABSTRACT

Semi-vulcanized butyl rubber compounds having a Mooney viscosity (ML-3 at 260° F) of about 30 to about 80 are produced by curing a mixture of butyl rubber, a plasticizer and a vulcanizing agent, the latter being employed in an amount that is insufficient for complete vulcanization of the rubber. The resultant semi-vulcanized compounds are readily processible during the formulation of sealant caulks and tapes and are further characterized by good dimensional stability which results from reduced flow of the compound.

20 Claims, No Drawings

SEMI-VULCANIZED BUTYL RUBBER FOR SEALANT APPLICATIONS

BACKGROUND OF THE INVENTION

This invention relates to the compounding of butyl rubber and more particularly relates to a method for producing a semi-vulcanized butyl rubber compound which can be used in formulating sealant compositions. Sealants are generally of two classes, i.e. hand or gun-applied caulks and preformed tapes or strips. Sealant compositions having a rubber base are generally characterized by an ability to stretch, good recovery after deformation, resistance to cohesive failure, and—particularly with respect to butyl rubber—excellent weathering properties. Sealant compositions which contain butyl rubber have thus come into wide use for the weather sealing of joints in automotive and architectural applications. However, one of the objectionable features of butyl tapes such as are used, for example, in the sealing of windows on automobiles or buildings, is the inability of the tape to remain dimensionally stable, i.e. the tape sags out of shape and may even flow out of the joint.

Reduction in the flow of butyl sealant has heretofore been accomplished by use of a vulcanizing agent which is inactive in the presence of solvent, but whereupon evaporation of the solvent from the sealant composition the rubber is cured at ambient temperature by reaction with the vulcanizing agent. The sealant is thus applied "green" for curing of the rubber in situ. The trouble with this method is, however, that evaporation of the solvent can be too slow and the sealant may lose its shape or run out of the joint before the rubber can cure. Furthermore, premature movement of the joint can cause failure of the seal.

Another method which has been employed for reducing the cold flow of such sealants is to employ butyl rubber which has been produced by reaction of its copolymers with a third monomer, e.g. divinyl benzene, during the polymerization process. The objection to this approach is that the resultant modified butyl rubber is extremely tough and nervy and is thus very difficult to process and mix during formulation of the sealant compound.

SUMMARY OF THE INVENTION

It is therefore an object of the present invention to provide a butyl rubber compound characterized by easy processing and good resistance to flow.

Still another object of this invention is to provide a butyl rubber compound for use in the formulation of sealant compositions.

Yet another object of the present invention is to provide an improved butyl rubber sealant composition.

Even another object of the present invention is to provide a method for quickly and easily producing a butyl rubber compound which can be advantageously employed in sealant compositions.

Other objects and advantages of the present invention will become apparent from the following description and the appended claims.

By means of the present invention, butyl rubber compounds which are easily processable, and which exhibit improved resistance to flow, are produced by partially vulcanizing butyl rubber after mixture with a plasticizer, e.g. an extender oil or polybutene, to provide a modified butyl rubber compound characterized by a Mooney viscosity (ML-3 at 260°F) of about 30 to about 80, and more advantageously of about 40 to about 60. To accomplish this the butyl rubber and the plasticizer are first blended together, along with a limited amount of a vulcanizing agent, to provide a mixture having a Mooney viscosity (ML-3 at 260°F) of about 15 to about 25, and this mixture is then subjected to conditions of time and temperature which result in substantially complete reaction between the rubber and the vulcanizing agent. Nonetheless, the butyl rubber of the resulting compound is only partially cured because of the limited amount of vulcanizing agent employed. The exact amount of vulcanizing agent which can be used in the practice of the invention cannot be precisely stated, of course, since it is dependent, inter alia, upon the molecular weight of the raw butyl rubber, e.g. 40–80 ML-1 + 8 at 212°F, the type of vulcanizing agent and curing conditions, the amount and type of plasticizer present, and also upon the desired Mooney viscosity of the semi-vulcanized compound.

The conditions of time and temperature at which the mixture is cured for semi-vulcanization of the butyl rubber is also subject to considerable variation, but there is particular advantage in using a vulcanizing agent and curing conditions which permit semi-vulcanization of the butyl rubber within about 1 to about 4 minutes at temperatures within the range of about 250°F to about 350°F. When it is desirable to do so, the curing operation can, therefore, be quickly and conveniently accomplished in conventional equipment for mixing or processing rubber, e.g. a Banbury mixer, an extruder, or the like.

Thus, in contrast to the usual manner for vulcanizing rubber, the semi-vulcanization step of the present invention can be carried out while the compound is being masticated. Accordingly, butyl rubber in the form of crumbs, the plasticizer, and the vulcanizing agent can be mixed together and subjected to the action of a heated Banbury or extruder to effect the cure. Where preferrable and practical, the plasticizer and the vulcanizing agent can be incorporated with a wet-crumb butyl rubber and the resultant mixture can then be passed through an extrusion drying process for removal of the water and also for semi-vulcanization of the butyl rubber of the mixture.

One manner in which the plasticizer and the vulcanizing agent can be incorporated into a wet-crumb butyl rubber is to first add both of these ingredients to a butyl rubber cement, i.e. a solution or pseudosolution of butyl rubber in an organic solvent. Subsequently the butyl cement can be fed into an agitated body of hot water for vaporization of the solvent and formation of a rubber coagulum in the form of crumbs which contain some of the aforementioned water. In such a case, the plasticizer and vulcanizing agent remain predominately in the organic phase and are thus bound into the wet crumb rubber. Alternatively, the vulcanizing agent can first be mixed with the plasticizer and this mixture can then be added to the agitated body of hot water during removal of the solvent from the butyl rubber cement, for in such a case it has been found that the plasticizer and the vulcanizing agent migrate to the rubber so that both are recovered with the wet crumb. In either case the resultant wet-crumb rubber can then be passed into an extrusion dryer for removal of water and semi-vulcanization of the butyl rubber, as previously described.

In other cases the plasticizer and the vulcanizer can be distributed throughout the butyl rubber prior to curing by means of an inert, pulverulent carrier material such as diatomaceous earth. In accordance with this technique, the plasticizer and the vulcanizing agent are thoroughly mixed together before addition to the rubber, the mixture being proportioned to provide the desired amount and ratio of plasticizer and vulcanizer. Accordingly, the particles of the carrier become coated with the plasticizer and vulcanizer, and are thus distributed throughout the butyl rubber during mastication. To advantage, the resultant coated carrier particles can be in the form of a flowable powder which is mixed with either wet- or dry-crumb butyl rubber, for the coating of the same with the powder, in order to uniformly distribute the plasticizer and the vulcanizer over the surface of the crumbs. The coated crumbs can then be masticated in the presence of heat to finish the mixing, effect the cure, and dry the rubber when water is present.

As previously indicated, the amount of plasticizer which can be mixed with the butyl rubber is subject to variation but from about 10 to about 40 parts, by weight, per 100 parts of the butyl rubber can be employed to advantage. Suitable plasticizers include non-aromatic extender oils, low molecular weight polybutenes and mixtures thereof. To further advantage, an amount of plasticizer can be employed which provides a Mooney viscosity (ML-3at260°F) of about 40 to about 60 in the finished semi-vulcanized compound.

Vulcanizing agents, among others, which can be employed to advantage in carrying out the invention are p-quinone dioxime and halogenated phenolic resins.

It will be understood that the mixture of butyl rubber and plasticizer that is cured for semi-vulcanization of the rubber can also comprise rubber fillers and compounding ingredients such as zinc oxide, clays, stearic acid and the like. The filler, however, should be relatively inert with respect to the vulcanizing agent lest the cure be deactivated.

The finished, semi-vulcanized butyl rubber compound can be mixed with a variety of other ingredients to produce a sealant caulk or tape, e.g. rubber fillers such as carbon black, calcium carbonate, $TiO_2$, clays, etc; extenders such as oils and liquid polybutenes; tackifiers; and a solvent if the sealant is a caulk.

It will be appreciated that the degree of semi-vulcanization that is accomplished in accordance with the invention is controllable, and is therefore variable. The actual extent to which the rubber is vulcanized is dependent upon the final viscosity level desired after the semi-vulcanization step, i.e. a specific value within the range of about 30 to about 80, ML-3at260°F. The reason for only partial vulcanization of the rubber is, of course, the fact that fully vulcanized compounds are too viscous for formulation into a satisfactory sealant composition. On the other hand, if the degree of vulcanization of the compound is too low, or nil, the sealant composition will flow excessively during use.

DESCRIPTION OF THE PREFERRED EMBODIMENTS

EXAMPLE I

In a Banbury mixer heated at 265°F and running at 2nd speed, the following ingredients were mixed:

| | Parts by weight |
|---|---|
| Butyl Rubber (ML-3at260°F)=55 | 100.0 |
| SP-1055[1] | 1.0 |
| Indopol H-100[2] | 25.0 |

[1]bromomethyl, alkylated, phenol-formaldehyde resin; Schenectady Chemicals, Inc.
[2]polybutene; Amoco Chemicals Corp.

The mixture was dumped from the Banbury at peak-power indication, which occurred after 3 minutes of mixing. The Mooney viscosity (ML-3at260°F) of this semi-vulcanized butyl rubber compound was 36, and it was then mixed into a tape composition having the following formulation:

| | Parts by weight |
|---|---|
| Semi-vulcanized Butyl Rubber compound | 100.0 |
| FEF Carbon Black | 75.0 |
| Indopol H-100 | 70.0 |
| Sunpar 2100[1] | 50.0 |
| Camel Carb[2] | 35.0 |

[1]Paraffinic Oil; Sun Oil Co.
[2]Dry ground calcium carbonate filler; Harry T. Cambell Sons' Corp.

On testing, this tape composition was found to have the following properties:

| Compression, lb./cu.in. | 83 |
|---|---|
| Yield, psi | 7.9 |
| Rebound, in.(5 min.) | 0.229 |
| Horizontal Heat Sag | |
| 1 hr. at 275°F | 1/32" |
| 3 hr. at 190°F | 1/32" |

It should be pointed out that these properties indicate that this composition could be advantageously employed as a tape for sealing automotive windshields. Nonetheless, the composition was relatively easy to mix and process because of the low viscosity of the semi-vulcanized butyl rubber compound.

EXAMPLE II

In this example, the plasticizer and the vulcanizing agent were mixed with an inert, pulverulent carrier prior to mixture with the rubber:

| | Parts by weight |
|---|---|
| Tuflo 6056[1] | 30.0 |
| Celite HSC[2] | 30.0 |
| SP-1055 | 1.0 |

[1]Rubber process oil; Sinclair Refining Co.
[2]Diatomaceous earth; Johns-Manville Products The brominated phenolic resin was first dissolved in the process oil after the latter had been heated to 200°F. This solution was then added to the diatomaceous earth, under agitation, for coating of the powder particles. 100 parts by weight of raw butyl rubber having a Mooney viscosity of 55 (ML-3at260°F) was then added to a cold Banbury and masticated for 30 seconds. The mixture of diatomaceous earth, process oil and vulcanizing agent was then added to the rubber in the cold Banbury wherein the ingredients were masticated for 2 ½ minutes and then dumped. To achieve semi-vulcanization of the butyl rubber, the cold-masticated mixture was placed in a Banbury at 290°F and masticated for 2.25 minutes. The Mooney viscosity (ML-3at260°F) of the reacted mixture was 50.

This semi-vulcanized butyl compound, and also the unmodified raw butyl rubber from which it was produced, were both formulated into a tape sealant composition for the purpose of comparing the physical properties of tapes produced from each. The compositions were mixed "upside down" in a Banbury heated to 180°F and running at 2nd speed. The polybutene plasticizer was added in three increments. The formula of the composition was as follows:

| | Parts by weight | |
|---|---|---|
| | A | B |
| Semi-vulcanized Butyl Rubber Compound | 161 | — |
| Unmodified Butyl Rubber | — | 100 |
| FEF Carbon Black | 100 | 100 |
| Indopol H-100 | 60 | 60 |
| Sunpar 2100 | 60 | 30 |
| Celite HSC | 30 | — |
| Stearic Acid | 2 | 2 |

These tape compositions were then tested and exhibited the following physical properties:

| | A | B |
|---|---|---|
| Compression, lb./cu. in. | 105 | 106 |
| Yield Strength, psi. | 10.5 | 11.2 |
| Rebound, in. (5') | 0.240 | 0.220 |
| Heat Flow Test | | |
| 1 hour at room temp. | 233 | 207 |
| 1 day at 190°F | 214 | 178 |
| Horizontal Heat Sag at 190°F, 24 hrs. | 1/32" | 2/32" |

It is particularly notable that Composition A, which contained the semi-vulcanized butyl rubber was characterized by significantly lower heat flow and heat sag, and is thus more suitable as a sealing tape than compound B which was produced from the unmodified butyl. It should be pointed out that lower flow is indicated by higher values in the heat flow test.

EXAMPLE III

Butyl rubber, having a Mooney viscosity (ML-3at260°F) of 55, was shredded into crumbs and then dissolved in hexane to make a 20 percent solution of rubber in the solvent. The following ingredients were then added to the cement:

| | Parts per hundred parts of rubber |
|---|---|
| Indopol H-100 | 25.0 |
| GMF[1] | 0.1 |
| Vulklor[2] | 0.4 |
| MBT[3] | 0.5 |

[1]p-quinone dioxime; Uniroyal, Inc.

[2] Vulcanizing agent; tetrachloro-p-benzoquinone Uniroyal, Inc.
[3] Mercaptobenzothiazole The cement containing these vulcanizing agents and the polybutene plasticizer was then fed into a large, vigorously agitated body of hot water (190°F), and this resulted in coagulation of the rubber by vaporization of the hexane. The resultant hexane vapor was then removed from the system. The rubber coagulum formed as porous crumbs which floated on the surface of the water. These wet crumbs, containing about 40–50 percent water, were then passed into an extrusion drying train. In the first part of the train the bulk of the water was squeezed out of the crumbs by means of an unheated extruder. In the second part of the drying train the partly dewatered crumb was passed into a second extruder, which was steam heated, and the rubber compound was heated therein to a temperature of about 275°–350°F. The rubber was discharged from this second extruder after a residence time of about 2–3 minutes and was then cooled to room temperature. As a consequence of this extrusion under heat, the butyl rubber compound was dried to a moisture level of less than 1.0 percent, and since the vulcanizing agents were present, the rubber partly vulcanized. The resultant semi-vulcanized butyl rubber compound had a Mooney viscosity (ML-3' at 260°F) of 41, and it was formulated into a tape sealant composition which contained the following ingredients:

| | Parts by weight |
|---|---|
| Semi-vulcanized Butyl Rubber Compound | 100 |
| FEF Carbon Black | 100 |
| Indopol H–100 | 55 |
| Sunpar 2100 | 55 |
| Microwhite 95[1] | 35 |
| Stearic Acid | 1 |

[1] Pulverized Limestone, Lahabra Products Co.

This formula was mixed upside down in a Banbury heated to 180°F and running at 2nd speed. The polybutene plasticizer was added in two increments. The finished tape composition was then tested and the following physical properties were found:

| | |
|---|---|
| Shore hardness, Durometer A | 20 |
| Compression, lb./cu.in | 93 |
| Yield strength, psi. | 9.7 |
| Horizontal heat sag, 24 hrs at 190°F | 1/32" |
| Outdoor Exposure, 24 months | No sag |

EXAMPLE IV

Using the semi-vulcanized butyl rubber compound of Example II (the reacted mixture of butyl rubber, plasticizer, vulcanizer and diatomaceous earth), a light colored architectural tape was produced in accordance with the following formulation. Blending of the ingredients was accomplished in a Baker-Perkins mixer:

| | Parts by weight |
|---|---|
| Cross-linked butyl rubber compound of Ex.II | 100.0 |
| Camel Carb | 100.0 |
| Asbestine 3X[1] | 50.0 |
| Indopol H–100 | 75.0 |
| TiPure R–900[2] | 10.0 |
| HiSil 233[3] | 20.0 |
| Stearic Acid | 2.0 |

[1] Fibrous magnesuim silicate, International Talc, Co.
[2] Titanium Dioxide: E.I. DuPont de Nemours & Co.
[3] Precipitated hydrated silica; PPG Industries Inc.

After formulation, this tape composition was tested and the following physical properties were found. A high quality tape having good resistance to cold flow is indicated:

| | |
|---|---|
| Compression, lb./cu. in. | 69 |
| Yield Strength, lb./sq.in. | 9.3 |
| 5' Rebound (in.) | 0.246 |
| Heat Flow Test | |
| 24 hours at 190°F | 0.218 |
| Horizontal Heat Sag, 24 hours at 190°F | 1/32" |

EXAMPLE V

Again using the semi-vulcanized butyl rubber compound of Example II, the following ingredients were uniformly blended together in a Baker-Perkins mixer to form a light colored caulking composition:

| | Parts by weight |
|---|---|
| Semi-vulcanized butyl rubber compound of Ex. II | 161.0 |
| Indopol H–100 | 200.0 |
| Microwhite 95 | 800.0 |
| Asbestine 3x | 400.0 |
| Stearic Acid | 2.0 |
| TiPure R-900 | 20.0 |
| Cobalt Drier | 0.2 |
| Keltrol 1001 [1] | 20.0 |
| Solvesso 100 [2] | 250.0 |

[1] Vinyl Toluene/Vegetable oil Copolymer; Spencer Kellogg
[2] Organic Solvent; Humble Oil & Refining Company This composition was evaluated and the following physical properties were found. A high quality, light colored caulk is indicated:

| | |
|---|---|
| Burrell-Severs Rheometer, 60 psi, 0.32" diameter | 7.1 |
| Hand gunnability (1=very good, 5=very poor) | 2+ |
| Time to Tack-Free | 3 hrs. |
| Shrinkage (percent) | 25.8 |
| Slump, 30 mins. | 1/32" |
| Bond Cohesion | very good |
| Hardness after 2 weeks at 158°F | 40 |

DESCRIPTION OF TESTS

Compression (pci)—Two specimens of tape 3 inches long × three-eighths inch square are placed 1 inch apart between two glass plates having dimensions of 3 inches × 3 inches × one-fourth inch. This assembly is compressed in an Instron Tester at a speed of 2 inches per minute until the distance between the plates is 0.200 inches. The pounds of pressure required to achieve this degree of compression is then converted to pounds per cubic inch based on the volume of the tape specimens. Testing is done at 75°F. This test provides one indication of ease of application. Compression values of 65 to 115 p.c.i. are desirable.

5 feet Rebound, in.—Using the same assembly as was employed for the compression test, distance between the glass plates is measured 5 minutes after the pressure is released. Testing is conducted at 75°F. This distance should not exceed 0.250, for otherwise the recovery of the tape from deformation may be so great as to cause mechanical problems after installation.

Yield (psi)—Using the same assembly as for compression and rebound, the glass plates are pulled apart in the Instron machine at the rate of 1 inch per minute (75°F) to failure of either the cohesive or adhesive bond. Pounds of pull required to effect this separation is converted to pounds per square inch based on the original average cross-sectional area of the tape specimens. A test value of at least 7.5 p.s.i. is desirable. This test measures the cohesive strength of the tape.

Heat Flow Test—An assembly as is used in the compression test is made up and is compressed to a thickness of 0.200 and held there for 1 minute. (Spacers are used to prevent overcompression) Compression is released, the spacers are removed, and the assembly is then subjected to the compression of a 1 ½ lb. weight. After 1 hour at 75°F, the distance between the plates is measured. After 24 hours at 190°F, the assembly is allowed to cool to room temperature for 1 hour and the distance between the plates is then measured. With either test, the distance between the plates should not be less than 0.200, the original compression thickness.

Horizontal Heat Sag (one thirty-second inch at 190°F)—A 3 inch long specimen of three-eighths inch square tape is adhered to a metal panel and the panel is then suspended vertically in a heated oven with the 3 inch dimension of the tape in the horizontal plane. Heat sag is measured at the top outermost edge of the specimen. Sag should not exceed one thirty-second inch.

While the present invention has been described with reference to particular materials, formulations, process conditions and the like, it will be understood that still others may be employed without departing from the spirit and scope of the invention as expressed in the appended claims.

Therefore, What Is Claimed Is:

1. Method of producing a butyl rubber compound comprising:
   a. incorporating with a butyl rubber cement a plasticizer for butyl rubber and a vulcanizing agent for butyl rubber,
   b. desolventizing the resulting mixture in hot water and thus producing a wet-crumb butyl rubber having an amount of said plasticizer incorporated therewith which imparts a Mooney viscosity (ML-3' at 260°F.) of about 15 to about 25 to said rubber, said wet-crumb rubber also having incorporated therewith an amount of said vulcanizing agent which is sufficient for only partial vulcanization of said rubber, and
   c. subjecting said wet-crumb to an extrusion drying process and therein dewatering, masticating and partially curing said rubber, and thus producing a semi-vulcanized butyl rubber compound characterized by a Mooney viscosity (ML-3' at 260°F.) of about 30 to about 80.

2. The method of claim 1 in which the rubber is semi-vulcanized within about 1 to about 4 minutes at a temperature of from about 250°F to about 350°F.

3. The method of claim 1 wherein said vulcanizing agent is first incorporated with said plasticizer and the mixture of these two is then mixed with said butyl rubber cement.

4. The method of claim 1 wherein the plasticizer for the butyl rubber is selected from the group consisting of non-aromatic extender oils, low molecular weight polybutene, and mixtures thereof.

5. The method of claim 1 wherein the amount of plasticizer employed in the mixture is within the range of about 10 to about 40 parts, by weight, per 100 parts of the butyl rubber.

6. The method of claim 1 wherein the vulcanizing agent is a halogenated phenolic resin.

7. The method of claim 1 wherein the vulcanizing agent is p-quinone dioxime.

8. The method of claim 1 wherein the Mooney viscosity of the semi-vulcanized butyl rubber compound is within the range of about 40 to about 60.

9. The method of producing a butyl sealing tape or caulk which comprises mixing the semi-vulcanized butyl rubber compound produced in claim 1 with at least one other rubber compounding ingredient.

10. The method of claim 9 wherein said compounding ingredient is a rubber filler.

11. The method of claim 9 wherein said compounding ingredient is a rubber extender.

12. The method of claim 9 wherein said compounding ingredient is a rubber tackifier.

13. The method of claim 9 wherein said compounding ingredient is a solvent for the rubber.

14. The method of producing a butyl rubber compound comprising:
   a. coating the particles of an inert, pulverulent carrier material with a plasticizer for butyl rubber and a vulcanizing agent for butyl rubber,
   b. coating crumbs of butyl rubber with the resulting coated particles of said carrier material, the amount of said vulcanizing agent thus added to said rubber being sufficient for only partial vulcanization thereof, and the amount of plasticizer thus added to the rubber being sufficient to impart thereto a Mooney viscosity (ML-3' at 260°F.) of about 15 to about 25 upon incorporation of said plasticizer in said rubber,
   c. subsequently masticating the resulting coated crumbs of butyl rubber in the presence of heat, thus incorporating said plasticizer and vulcanizing agent with the rubber and also partially vulcanizing said butyl rubber during the mastication, and
   d. recovering a semi-vulcanized butyl rubber characterized by a Mooney viscosity (ML-3' at 260°F.) of about 30 to about 80.

15. The method of claim 14 wherein the crumbs of butyl rubber are dry crumbs.

16. The method of claim 14 wherein the crumbs of butyl rubber are wet crumbs.

17. The method of claim 14 in which the butyl rubber is semi-vulcanized within about 1 to about 4 minutes at a temperature of from about 250°F to about 450°F.

18. The method of claim 17 in which the coated crumbs of butyl rubber are masticated and the rubber is cured by passage through a heated extruder.

19. The method of claim 14 in which the Mooney viscosity of the semi-vulcanized butyl rubber compound is within the range of about 40 to about 60.

20. The method of claim 14 wherein said coated carrier particles are in the form of a powder and said butyl rubber crumbs are coated with said powder.

* * * * *